June 20, 1961 J. L. MICHAELIS Re. 25,000
NOVEL APPARATUS
Original Filed Dec. 5, 1956
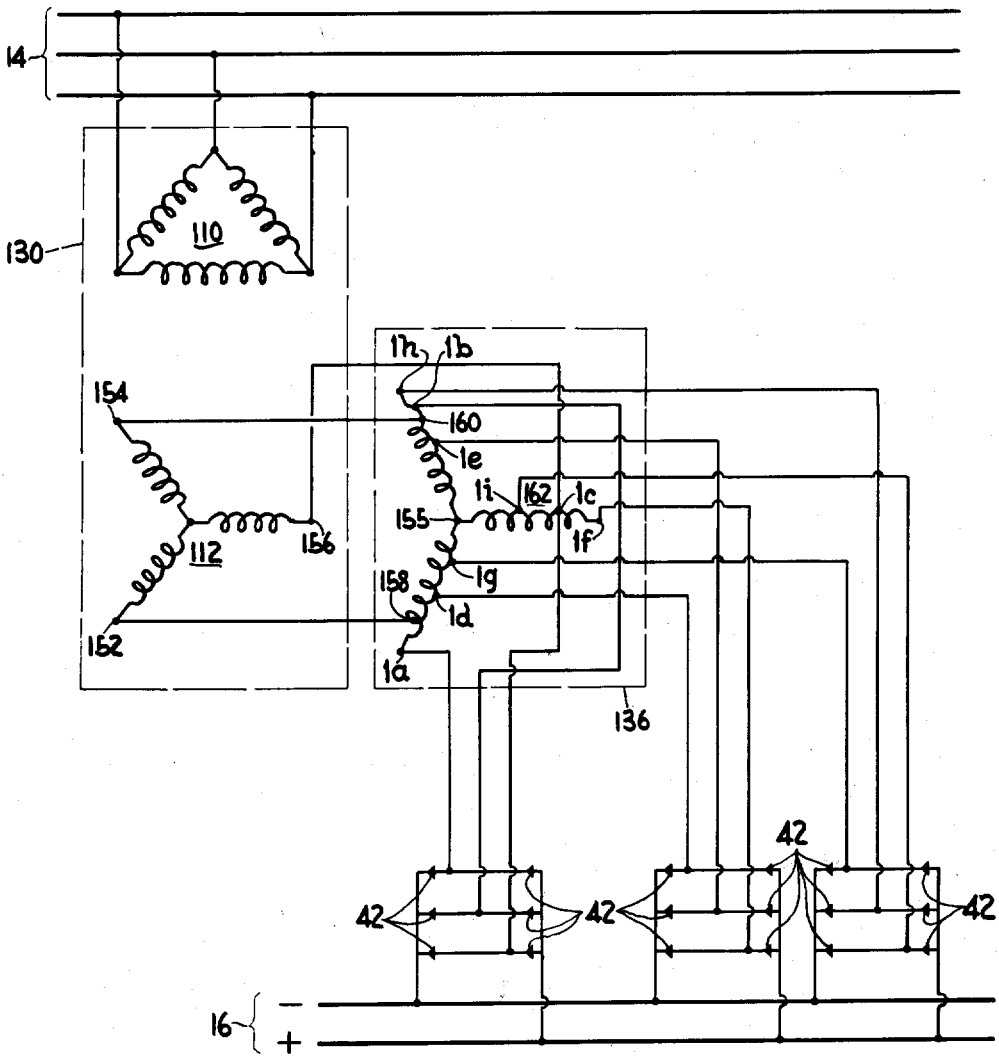
INVENTOR.
JOHN L. MICHAELIS
BY
Oscar A. Spencer
ATTORNEY United States Patent Office Re. 25,000

Reissued June 20, 1961

25,000

NOVEL APPARATUS

John L. Michaelis, Pittsburgh, Pa., assignor, by mesne assignments, to Pittsburgh Plate Glass Company Original No. 2,881,383, dated Apr. 7, 1959, Ser. No. 626,357, Dec. 5, 1956. Application for reissue May 24, 1960, Ser. No. 31,505

15 Claims. (Cl. 321—27)

Matter enclosed in heavy brackets [ ] appears in the original patent but forms no part of this reissue specification; matter printed in italics indicates the additions made by reissue.

This invention relates to apparatus for supplying direct current at amperages in excess of 10,000 amperes, frequently above 20,000 amperes, at voltages in the range of 100 to 500 volts or above from an alternating current power source. It is especially adapted for supply of current to a series of electrolytic cells such as a series of alkali metal chloride cells which are used for the production of chlorine and caustic soda.

In the performance of various chemical reactions such as in the production of chlorine and caustic soda by electrolysis of sodium chloride a series of electrolytic cells are connected together and energized by a direct current power source. These cells operate at a relatively low voltage (usually below) about 10 volts and in recent years have been developed to operate at a very high amperage normally 10,000 to 20,000 amperes or more. Heretofore the current has been supplied to such cells by rectification of alternating current by means of mechanical or mercury arc rectifiers. The high internal resistance of such rectifiers can result in substantial loss of power particularly when used in connection with cells having the high current demand referred to above.

The present invention permits use of semiconducting rectifiers which operate at power efficiencies in excess of 95 percent and which have relatively low internal resistance, generally below about 0.02 ohm. Such rectifiers have internal voltage drops below one volt frequently in the range of 0.42 to 0.54 volt. By use of such semiconducting rectifiers as herein contemplated, a substantial saving in power is effected. Rectifiers of the type herein contemplated are those which rely upon the semiconductor properties of certain metalloids such as metallic germanium or silicon.

The unusually low resistance and high efficiency of the germanium and silicon rectifiers makes their use attractive. However, individual rectifiers can supply only a small amount of current in the range of about 50–500 amperes. Hence, I have found that it is necessary to use a large number of such rectifiers coupled in parallel to meet the high current demand.

In such a case, however, the unusually low internal resistance of germanium and like rectifiers creates a problem. Inevitably, the various rectifiers which are coupled together vary in the magnitude of their internal resistance. The variation in terms of internal voltage drop from rectifier to rectifier is below plus or minus 0.25 volt, usually plus or minus about 0.05 volt. Consequently, when connected in parallel, those rectifiers in the parallel circuit having materially lower resistances than the others pass a disproportionate share of the load current and become inefficient or inoperative due to overload and subsequent failure.

The present invention affords a simple and convenient means for avoiding these difficulties. According to this invention an alternating current power supply is coupled in [parallel] *series* with a plurality of circuits each containing a semiconducting rectifier having an internal resistance below 0.02 ohm such as a germanium or silicon rectifier. Also in series with the rectifier in each circuit on the alternating current side thereof is a small electromotive force. The magnitude of this electromotive force normally is quite small frequently being of the order of 0.2 volt or less per rectifier element or diode and is such that it adds to or subtracts from the impressed alternating current voltage an amount of electromotive force sufficient to compensate for the differences in internal resistance between the rectifiers in the several circuits and thereby to balance the circuits and to avoid overloading of individual rectifiers.

In the practice of this invention, a system is employed which may comprise a single or a relatively large number of balanced alternating current outputs, each of these outputs being used to energize a single rectification circuit. The rectification circuit may consist of a single diode or a bridge circuit employing a plurality of diodes in series or a plurality of such bridge circuits in parallel. All of these rectification circuits supply the common load. If all the alternating current outputs were maintained at an equal potential, each rectification circuit fed therefrom would be forced to carry a more equal share of the load current. Such a number of alternating current outputs at satisfactory voltages are obtained in the present system from a plurality of transformers or a plurality of windings on the same transformer. It is not practical, however, with ordinary transformers alone to achieve any high degree of identity to output voltage without going to great expense in manufacture. Induced voltages will vary slightly from winding to winding; and, furthermore, at such high currents as will be met in the above-mentioned rectification systems, the differences in transformer internal impedance as seen by the load become especially important. Ordinary transformers will match impedances with 7½ percent if the transformers are manufactured to identical mechanical and electrical specifications. If one transformer is wound with a number of secondary windings, it is still difficult to match the impedances of the secondaries within 5 percent without extra manufacturing costs. Furthermore, if it is desired that the secondaries feed rectifiers having somewhat unforeseen characteristics with identical currents, manufacturing exactness of the antecedent transformers will not achieve the desired result.

When a plurality of transformers are used to supply the alternating current power for rectification the variation from transformer to transformer may be dealt with by providing a plurality of taps off the primary or secondary winding so that the output of the transformer may be at different voltages depending upon the voltages between taps. By providing a number of taps which have relatively small voltages therebetween, it is possible to couple all of the transformers at identical voltage output simply by selecting the proper taps from each transformer.

In any event whether one or many secondary windings are used, it is necessary to provide balancing electromotive force in series with each rectifier bridge in order to compensate for variation in rectifiers. An effective balancing apparatus for practice of this invention includes an autotransformer energized by alternanitg current of frequency and phase substantially identical with that of the alternating current source. This autotransformer has a number of tapped connections wherewith portions of the autotransformer may be connected serially with the rectifier and the windings of the power source. It is preferable and economical to employ a three-phase alternating current source and a three-phase autotransformer in this system, although single-phase systems are also practical. The alternating current source employed would ordinarily be a transformer, but could conceivably be an alternating current generator or other source.

The invention will be described with reference to the ccompanying drawing which shows an embodiment of ıe invention wherein an autotransformer is connected to ıe output of an alternating current source and has vari- ıus taps thereon for feeding rectification circuits.

In this embodiment, there is provided a three-phase al- ernating current transformer 130 having a primary wind- ıg 110 and a secondary winding 112. The primary wind- ıg is here shown delta connected, and the secondary is hown star connected; but any arrangement of three-phase vindings might be employed giving the desired voltage utput at terminals 152, 154 and 156. Across these lat- er terminals is connected a tapped three-phase autotrans- ormer 136 providing both stepped-up and stepped down oltages. Both step up and step down is achieved by plac- ıg input terminals 158, 160 and 162 between the com- non neutral connection 155 of the windings and the ex- remities thereof. The lettered taps shown on the auto- ransformer are presentative of any number of selectable aps placed on the autotransformer windings so that de- ired voltages may be obtainable. A three-phase rectifi- ation circuit employing diodes 42 is shown connected to aps 1a, 1b and 1c on the autotransformer. Another rec- ification circuit is supplied from 1d, 1e and 1f, while a hird rectification circuit is shown supplied from taps 1g, h and 1i. The rectification circuits shown here are six- lement bridge circuits. The bridge circuits supply a com- non direct current line 16 for energizing a load. The umber of rectification circuits here employed is merely epresentative of the many more which may be used.

In the operation of the circuit illustrated, desired volt- ıges are supplied to the rectification circuits composed of liodes 42, and the exact voltages are governed by the set- ings of selectable taps 1a to 1i inclusive which add to or ubtract from the voltages supplied from the terminals 152, 154 and 156. Thus, diodes or series of diodes having ı low forward resistance may properly be supplied with a ower input voltage than diodes having a higher forward esistance. The autotransformer taps can be arranged such hat all diodes 42 carry substantially the same share of oad current.

In the illustrated embodiment there is shown one three- phase transformer. It will be understood that a plurality of such transformers may be used to feed pluralities of bridges all of which have their direct current outputs con- nected in parallel. Moreover, the three-phase units can be replaced by single-phase units.

For the sake of simplicity, the drawing illustrates but one diode in a single circuit. Generally, however, a plu- rality of such diodes are connected in series in order to supply direct current at a voltage of several hundred volts. Moreover, in the usual system a plurality of series of di- odes are coupled with each terminal 152, 154 and 156, he several series being coupled in parallel. Each such series is coupled with an electromotive force which adds o or subtracts from the impressed voltage to compen- sate for variation in the forward internal resistance of the diodes or bridge of a series of such diode, from diode to diode, or from bridge to bridge.

The magnitude of such electromotive force per diode is small rarely exceeding 0.3 volt per diode and usually be- ing in the range of about 0.05 volt. Where bridges com- prising pluralities of diodes are used, the electromotive force required is, of course, dependent upon the vectorial sum of the variations of the several diodes in the bridge and may be quite small or quite large.

A specific example will more clearly illustrate this in- vention.

EXAMPLE I

A typical installation is to supply direct current electric power of 45,000 amperes and 250 volts. With 150 am- pere size rectifier junctions each three-phase bridge will provide 450 amperes output. Thus 100 bridges are re- quired in parallel each rated 450 amperes to provide 45,000 amperes total output.

This 45,000 amperes at 250 volts output or 11,250 kw. will require an A.C. power input of 11,250 kw. plus losses. These losses will be neglected to simplify discussion. The A.C. voltage input required is about 190 volts three phase to provide the 250 volts D.C. output.

Each bridge requires 112.5 A.C. kw. input at 190 volts, three-phase, or 342 A.C. amperes. The 100 bridges re- quire an A.C. input current of 34,200 A.C. amperes.

Usually commercial germanium diodes today will with- stand an inverse peak voltage of 90 volts. In this ex- ample, five diodes are connected in series per leg for 250 volts D.C. output voltage. Thus actually 30 diodes are required for a six-element bridge as shown.

To supply A.C. power to these 100 bridges requires either:

A. 100 transformers each providing 342 A.C. amperes @ 190 v.

B. 10 transformers each providing 3420 A.C. amperes @ 190 v.

C. 1 transformer providing 34,200 A.C. amperes @ 190 volts.

When ten transformers are used ten rectifier bridge circuits are supplied power from one transformer winding.

High efficiency germanium rectifier junctions have in- ternal voltage drops ranging from .42 volt to .54 volt. In addition the lead length and resistance of connections may be unequal. With ten parallel circuits, careful selec- tion of units would permit paralleling of units of equal internal resistance and thus equal load division. But careful matching of equal internal resistance diodes can- not compensate for variations in connection lead lengths, nor is the problem ended from a maintenance viewpoint in the future when replacements are required, since a stock must be available to permit replacement with an exact value internal resistance diode.

This illustrates the necessity of a balancing circuit that shall force the ten parallel circuits to equally divide load with diodes of unequal internal resistance, connection leads of unequal impedance and electrical connections of the leads and diodes of unequal resistance.

To accomplish equal load division, a small potential is placed in series with such bridge of the ten parallel diodes.

An autotransformer similar to that shown in the draw- ing provides an additive or subtractive potential in con- junction with the rectifier power transformer. Thus each of bridge circuits is supplied alternating current power from the rectifier power transformer 130 but any one of seven taps are available as vernier adjustment voltages to force the diodes to equally divide load.

In any three-phase transformer the sum of the A.C. currents equals zero. However, one phase may carry slightly more load (D.C. from the rectifiers). This un- balance would result in a D.C. residual current in the balancing autotransformer. To minimize any D.C. satu- ration of the balancing autotransformer, a fifty mils air gap is provided in the iron circuit.

Experiments have shown with no balancing device the current flow in the ten parallel diodes will vary approximately 40% from the high to low current, with presently commercially available diodes.

On the initial assembly and testing of the rectifier assembly a clamp-on type ammeter may easily determine the high and low current circuits. The alternating cur- rent connection from the bridge may be quickly moved to one or two higher or lower autotransformer potential taps to equalize the output current. Once the ten parallel circuits are balanced within the desired tolerance, the connections may remain on that specific autotransformer tap. If in the future a diode is replaced, then the bal- ance may be altered due to a significant change in the internal resistance of the new diode compared to the former diode. An autotransformer potential tap may be selected that will provide the desired output current.

This balancing autotransformer is small electrically and in physical size, that is, say 3000 amperes at .14 volt is 420 volt amperes but only a reduced ampere capacity at the end taps is required. Thus over-all this transformer may be about .2 k.v.a. and relatively low in cost, especially since three .2 k.v.a. transformers are required for the one 1,125 k.v.a. three-phase rectifier power transformer. The unbalanced potential in the ten parallel circuits is so small and it is impractical to provide 100 power transformers for this type installation.

Balancing is required between the ten 1,125 k.v.a. power transformers because of their unequal impedance. Six ¼ of 1% taps are suggested on the primary winding of these ten power transformers to permit adjustment that will provide equal load carrying capability for each of these ten power transformers.

While an autotransformer effectively serves to supply the balancing potential herein sought, other means of supplying such potential may be resorted to within the purview of this invention. Thus, in lieu of an autotransformer, a transformer having primary and secondary windings is energized independently of transformer 130. In such a case, pluralities of taps from the secondary winding are provided to supply the small balancing electromotive force required.

Although the present invention has been described with reference to the specific details of certain embodiments, it is not intended that such details shall be regarded as limitations on the scope of the invention, except insofar as included in the accompanying claims.

What is claimed:

1. A direct current power source capable of supplying a load of at least 10,000 amperes which comprises an alternating current power source, a plurality of individual circuits *coupled in parallel,* each *of said individual circuits* comprising a small alternating electromotive force in series with a rectifier having an internal resistance less than 0.02 ohm, [each of] said *individual* circuits coupled in [parallel] *series* with said alternating current source to provide a source capable of supplying a direct current, the magnitude and polarity of each of said electromotive forces being such as to compensate for the differences in internal resistance in the respective rectifiers of said *individual* circuits and to provide substantially the same load current through each of said rectifiers.

2. A direct current power source capable of supplying a load of at least 10,000 amperes which comprises an alternating current power source, a plurality of individual circuits *coupled in parallel,* each *of said individual circuits* comprising a small alternating electromotive force in phase with said alternating current power source and in series with a rectifier having an internal resistance less than 0.02 ohm, [each of] said *individual* circuits coupled in [parallel] *series* with said alternating current source to provide a source capable of supplying a direct current, the magnitude and polarity of each of said electromotive forces being such as to compensate for the differences in internal resistance in the respective rectifiers of said *individual* circuits and to provide substantially the same load current through each of said rectifiers, and means to connect said direct current power source to a plurality of electrolytic cells in series.

3. A direct current power source capable of supplying a load of at least 10,000 amperes which comprises an alternating current power source, a plurality of individual circuits *coupled in parallel,* each *of said individual circuits* comprising a small alternating electromotive force in series with a germanium rectifier having an internal resistance less than 0.02 ohm, [each of] said *individual* circuits coupled in [parallel] *series* with said alternating current source to provide a source capable of supplying a direct current, the magnitude and polarity of each of said electromotive forces being such as to compensate for the differences in internal resistance in the respective rectifiers of said *individual* circuits and to provide substantially the same load current through each of said rectifiers.

4. A direct current power source capable of supplying a load of at least 10,000 amperes which comprises an alternating current power source, a plurality of individual circuits *coupled in parallel* each *of said individual circuits* comprising a small alternating electromotive force in series with a silicon rectifier having an internal resistance less than 0.02 ohm, [each of] said *individual* circuits coupled in [parallel] *series* with said alternating current source to provide a source capable of supplying a direct current, the magnitude and polarity of each of said electromotive forces being such as to compensate for the differences in internal resistance in the respective rectifiers of said *individual* circuits and to provide substantially the same load current through each of said rectifiers.

5. The power source of claim 1 wherein the magnitude of said electromotive force is not in excess of 0.3 volt per rectifier unit in series therewith.

6. The power source of claim 3 wherein the magnitude of said electromotive force is not in excess of 0.3 volt per rectifier unit in series therewith.

7. An electric power source capable of supplying low voltage, high amperage direct current which comprises an alternating current winding, a plurality of [rectifiers] *rectifier circuits* in series with said winding *said circuits having a plurality of semiconductor rectifiers in series therein,* and thereby providing a direct current potential *said circuits being coupled in parallel,* and means for balancing the direct current potentials produced by said *rectifier circuits* [winding] comprising an autotransformer having a winding in phase with said alternating current winding and means for supplying balancing additive and subtracting potential to said *rectifier circuits* [alternating current winding] from said autotransformer.

[8. An electric power source capable of supplying low voltage high current energy comprising an alternating current transformer having a primary winding and a secondary winding, an autotransformer connected to and deriving power from said secondary winding, said autotransformer having a plurality of taps and rectification means for converting alternating current into direct current connected between various of said taps.]

[9. The power source of claim 8 wherein said rectification means comprises a bridge circuit having a diode in each leg thereof and having output connections for supplying energy to a load.]

10. A direct current power source capable of supplying a load of at least 10,000 amperes which comprises a alternating current power source, a plurality of rectifiers in separate circuits, said rectifiers having individual internal resistances less than 0.02 ohm, an autotransformer taps off the autotransformer supplying an electromotive force from the autotransformer, each of said circuits being coupled in series with the alternating current power source and one of said taps, said circuits being coupled in parallel, the magnitude of the electromotive force supplied by said taps being such as to compensate for the difference in internal resistance between circuits and provide substantially the same load current through each of the rectifiers.

11. The power source of claim 10, wherein the magnitude of the electromotive force supplied by each of said tap is not in excess of 0.3 volt per rectifier in series therewith.

12. The power source of claim 1 wherein the sm electromotive force is supplied from an energy sour independent of said alternating current power sour 13. The power source of claim 1 wherein the sm alternating electromotive force is in phase with the alt nating current source.

14. The power source of claim 1 wherein said alt nating current power source comprises a plurality separate transformers the output of each transform being connected to at least two of said individual circuits.

*15. A direct current power source capable of supplying a load of at least 10,000 amperes which comprises an alternating current power source, a plurality of individual circuits coupled in parallel each of said circuits comprising a small electromotive force in series with a plurality of rectifiers, each of said rectifiers having an internal resistance of less than 0.02 ohm, said circuits being coupled in series with said alternating current source to provide a source capable of supplying a direct current, the magnitude and polarity of each of said electromotive forces being such as to compensate for the differences in internal resistance in the respective rectifiers of said circuits and to provide substantially the same load current through each of said rectifiers.*

*16. An electric power source capable of supplying low voltage, high amperage direct current which comprises an alternating current transformer having a primary winding and a secondary winding, a plurality of rectifier circuits in series with said secondary winding, each of said*

*circuits having a plurality of semiconducting rectifiers in series therein and thereby providing a direct current potential, said circuits being coupled in parallel and an autotransformer connected to and deriving power from said secondary winding, said autotransformer having a plurality of taps connected to said rectifier circuits for supplying balancing additive and subtracting potential to said rectifier circuits.*

*17. The power source of claim 16 wherein the rectifier circuits comprise bridge circuits having a diode in each leg thereof and having output connections for supplying energy to a load.*

References Cited in the file of this patent or the original patent

UNITED STATES PATENTS 2,800,621 Carlson et al. ---------- July 23, 1957

FOREIGN PATENTS 846,724 Germany ---------- Aug. 18, 1952